US012716995B2

(12) United States Patent
Wilkes et al.

(10) Patent No.: US 12,716,995 B2

(45) Date of Patent: Aug. 25, 2026

(54) INTEGRATION OF VIRTUAL CHANNELS FROM DOPPLER DIVISION MULTIPLEX (DDM) FMCW RADAR SIGNAL

(71) Applicant: Infineon Technologies, Neubiberg (DE)

(72) Inventors: Dyson Wilkes, Marlborough (GB); David Addison, Bristol (GB); Markus Bichl, Feldkirchen-Westerham (DE)

(73) Assignee: Infineon Technologies, Neubiberg (DE)

(*) Notice: Subject to any disclaimer, the term of this patent is extended or adjusted under 35 U.S.C. 154(b) by 586 days.

(21) Appl. No.: 18/304,585

(22) Filed: Apr. 21, 2023

(65) Prior Publication Data

US 2024/0353527 A1 Oct. 24, 2024

(51) Int. Cl.

*G01S 7/35* (2006.01)
*G01S 7/41* (2006.01)
*G01S 13/58* (2006.01)

(52) U.S. Cl.

CPC ............... *G01S 7/356* (2021.05); *G01S 7/411* (2013.01); *G01S 13/584* (2013.01)

(58) Field of Classification Search

CPC ........ G01S 13/584; G01S 7/356; G01S 7/411; G01S 13/524; G01S 13/5244; G01S 13/53

See application file for complete search history.

(56) References Cited

U.S. PATENT DOCUMENTS 9,746,549 B1* 8/2017 Parker ..................... G01S 7/292
11,513,187 B2* 11/2022 Stettiner ................. G01S 7/356
2015/0070207 A1* 3/2015 Millar ................. G01S 13/4454 342/174
2016/0041260 A1* 2/2016 Cao ......................... G01S 7/285 342/129
2019/0041494 A1* 2/2019 Roger ..................... G01S 7/003
2019/0146058 A1* 5/2019 Roger ..................... G01S 7/288 342/175
2020/0130697 A1* 4/2020 Insana ..................... G01S 13/42
2021/0080557 A1* 3/2021 Vaishnav ................ G01S 13/72
2021/0116541 A1* 4/2021 Schubert ................. G01S 7/415
2021/0333386 A1* 10/2021 Park ........................ G01S 7/356
2021/0389777 A1* 12/2021 Cho ...................... B60W 10/04
2022/0120890 A1* 4/2022 Roger ..................... G01S 7/356
2023/0051791 A1* 2/2023 Sturm ..................... G01S 7/023

(Continued)

OTHER PUBLICATIONS

Minh Q. Nguyen et al. "Fast-Chirp FDMA MIMO Radar System Using Range-Division Multiple-Access and Doppler-Division Multiple-Access", IEEE Transactions on Microwave Theory and Techniques, vol. 69, No. 1. Published Jan. 2021.

*Primary Examiner* — Vladimir Magloire
*Assistant Examiner* — Kimberly Jenkins
(74) *Attorney, Agent, or Firm* — Eschweiler & Potashnik, LLC

(57) ABSTRACT

Some aspects of the present disclosure relate to baseband processor for radar. The baseband processor includes a Doppler fast Fourier transform (FFT) circuit having an input and an output. An integration circuit has an input coupled to the output of the Doppler FFT circuit. A target detection circuit has an input coupled to an output of the integration circuit. The Doppler FFT circuit, the integration circuit, and the target detection circuit are each disposed on a silicon substrate, and the target detection circuit is arranged in series with the integration circuit and in series with the target detection circuit.

16 Claims, 8 Drawing Sheets

(56) References Cited

U.S. PATENT DOCUMENTS

| | | | | |
|---|---|---|---|---|
| 2023/0092131 | A1* | 3/2023 | Lao | G01S 13/325 342/200 |
| 2023/0096861 | A1* | 3/2023 | Bichl | G01S 13/584 342/109 |
| 2023/0104290 | A1* | 4/2023 | Li | G01S 7/0236 342/189 |
| 2023/0228861 | A1* | 7/2023 | Kishigami | G01S 13/347 342/200 |
| 2023/0305104 | A1* | 9/2023 | Hekstra | G01S 7/032 |
| 2023/0324509 | A1* | 10/2023 | Wu | G01S 7/354 342/109 |
| 2024/0077601 | A1* | 3/2024 | Wang | G01S 13/505 |
| 2024/0151843 | A1* | 5/2024 | Govinda Kammath | G01S 7/415 |
| 2024/0311320 | A1* | 9/2024 | Addison | G06F 13/28 |

* cited by examiner

Fig. 4A (Sum VTx1+VTx2+VTx3 to give Doppler 0, Range 0 power intensity)

Fig. 4B (Sum VTx1+VTx2+VTx3 to give Doppler 1, Range 0 power intensity)

Fig. 4C (Sum VTx1+VTx2+VTx3 to give Doppler 31, Range 0 power intensity)

Fig. 4D (Sum VTx1+VTx2+VTx3 to give Doppler 0, Range 1 power intensity)

Fig. 4E (Sum VTx1+VTx2+VTx3 to give Doppler 1, Range 1 power intensity)

Fig. 4F (Sum VTx1+VTx2+VTx3 to give Doppler 31, Range 1 power intensity)

INTEGRATION OF VIRTUAL CHANNELS FROM DOPPLER DIVISION MULTIPLEX (DDM) FMCW RADAR SIGNAL

FIELD

The present disclosure relates in general to electronic systems such as radar systems, and more particularly, to radar systems that utilize Doppler division multiplexing in frequency modulated continuous wave radar.

BACKGROUND

Radar (RAdio Detection And Ranging) systems use radio waves to determine the location and/or velocity of targets in a field. Historically, radar has been used to detect aircraft, ships, spacecraft, guided missiles, and terrain, among others. In more recent times, radar has also been used to study and/or predict weather formations, and has been used in collision-detection and/or collision-avoidance in motor vehicles. A radar system includes a transmitter to produce electromagnetic waves in the radio or microwave domain, a receiver to receive those waves after they bounce back from one or more targets in a field, and a processor to determine properties of the targets. The electromagnetic waves from the transmitter can be pulsed or continuous, and reflect off the target and return to the receiver, giving information about the target's location and/or velocity relative to the radar system.

DETAILED DESCRIPTION

Figures 1, 2:
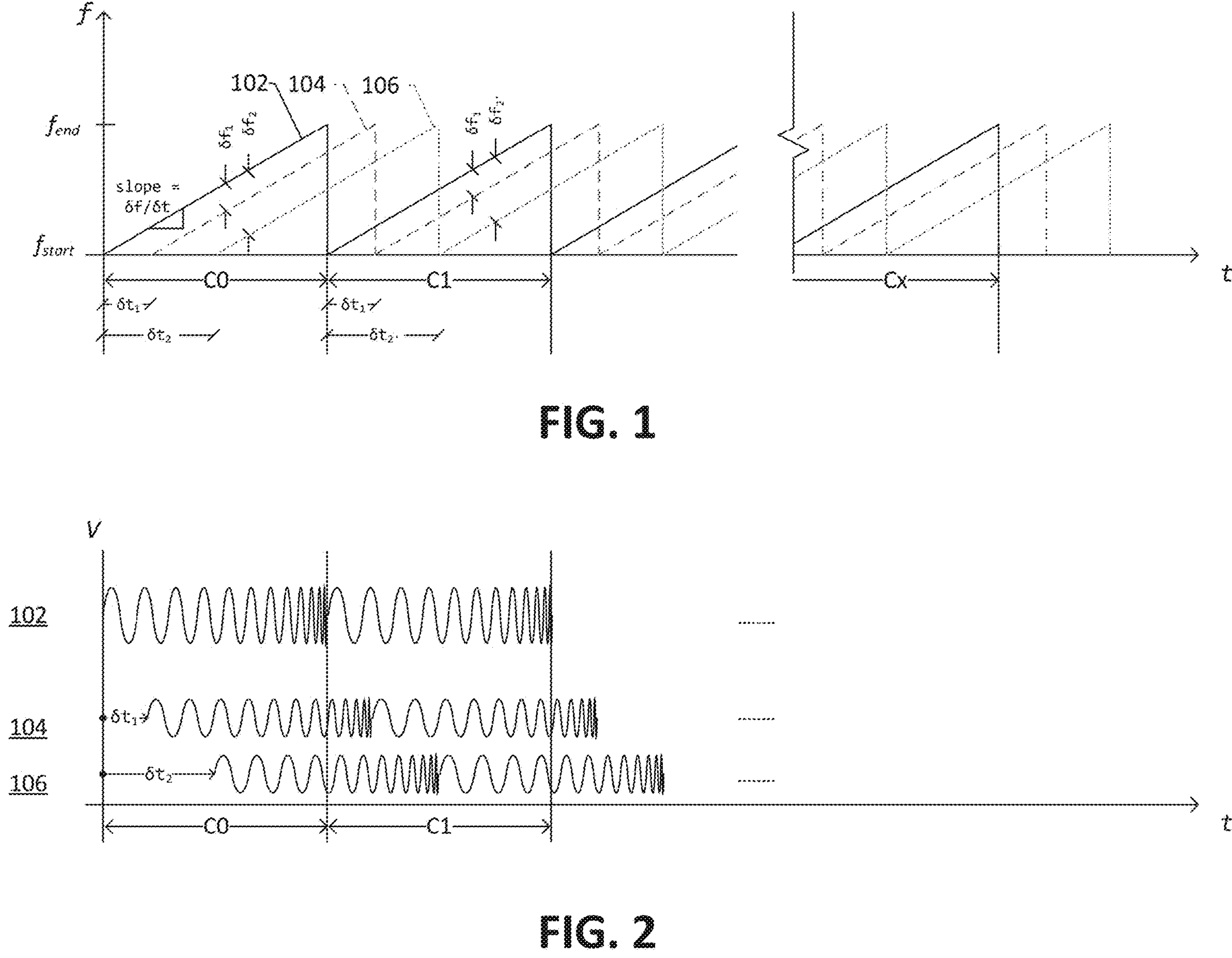
FIG. 1 illustrates a frequency-time plot for a transmitted waveform and received waveforms used in a frequency modulated continuous wave (FMCW) radar system.
FIG. 2 illustrates a voltage-time plot for the transmitted waveform and received waveforms of FIG. 1.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware.

Radar systems transmit electromagnetic waves in the form of discrete pulses or continuous waves, and then listen for received pulses (or echoes) to determine the location and/or velocities of targets in a field. For example, FIG. 1 shows an example of a simple transmitted waveform 102 transmitted by a frequency modulated continuous wave (FMCW) radar system, and two received waveforms (or echoes) 104, 106 that reflect back from various targets in the field. It will be appreciated that these waveforms are merely non-limiting examples, and actual waveforms can take any number of forms.

The transmitted waveform 102 includes a series of ramps or "chirps", which are transmitted so as to be repeated at regularly spaced time windows C0, C1, C2, . . . , Cx. FIG. 1 shows the instantaneous frequency of the chirps versus time, while FIG. 2 shows the corresponding modulated voltage signals of the chirps as they are transmitted in the corresponding time windows C0, C1, . . . . Each ramp starts at the beginning of a given time window at a start frequency $F_{start}$ and ramps up or down to an end frequency $F_{end}$ at the end of the given time window. Ideally, each ramp has a constant slope during that time window, which provides a link between time delay, beat frequency, and range for various targets in the FMCW radar system. In actual implementations, the slope may not be perfectly constant and may vary slightly in time.

The received waveforms 104, 106 or "echoes" are in response to the transmitted waveform 102. The received waveforms 104, 106 are time delayed copies of the transmitted waveform 102 and also carry a Doppler component due to the relative velocity of the target from which they reflect. Thus, for example, in FIG. 1 and FIG. 2, the first received waveform 104 is reflected from a first target at range 1 and is delayed relative to the transmitted pulse by a first delay, δt1 for the first time window C0. Similarly, the second received waveform 106 is reflected from a second target at range 2 and is delayed relative to the transmitted waveform 102 by a second delay, δt2 for the first time window C0. Because these time delays δt1, δt2 represent the roundtrip delay from the transceiver to the first and second targets in the field, these time delays form the basis of determining the first and second ranges to the first and second targets, respectively.

Further, for later time windows, if the targets are moving, the delay and/or frequency difference at a given time between the transmitted waveform 102 and the received waveforms (e.g., 104, 106) may change slightly, and this can evidence the velocity of various targets. For instance, for the first and second time windows, consider the first target is a first range from the transceiver and corresponds to the first delay, δt1 (and equivalently a first frequency shift δf1). Because this first delay, δt1, is unchanged in the first and second time windows, it suggests that the first target is at the same range at both times (e.g., and has zero relative velocity), relative to the radar transceiver. However, the second target has a second delay δt2 for the first time window and has a slightly perturbed delay δt2' (which differs slightly from the second delay δt2) for the second time window. Therefore, this small change between δt2 and δt2' manifests itself as a Doppler shift for the second target, and suggests the second target is moving with some non-zero velocity relative to the radar transceiver. Note that, relative to the duration of a given time window, the lengths of the time delays δt1, δt2 are exaggerated in FIG. 1 and FIG. 2 for purposes of clarity of understanding.

Figure 3:
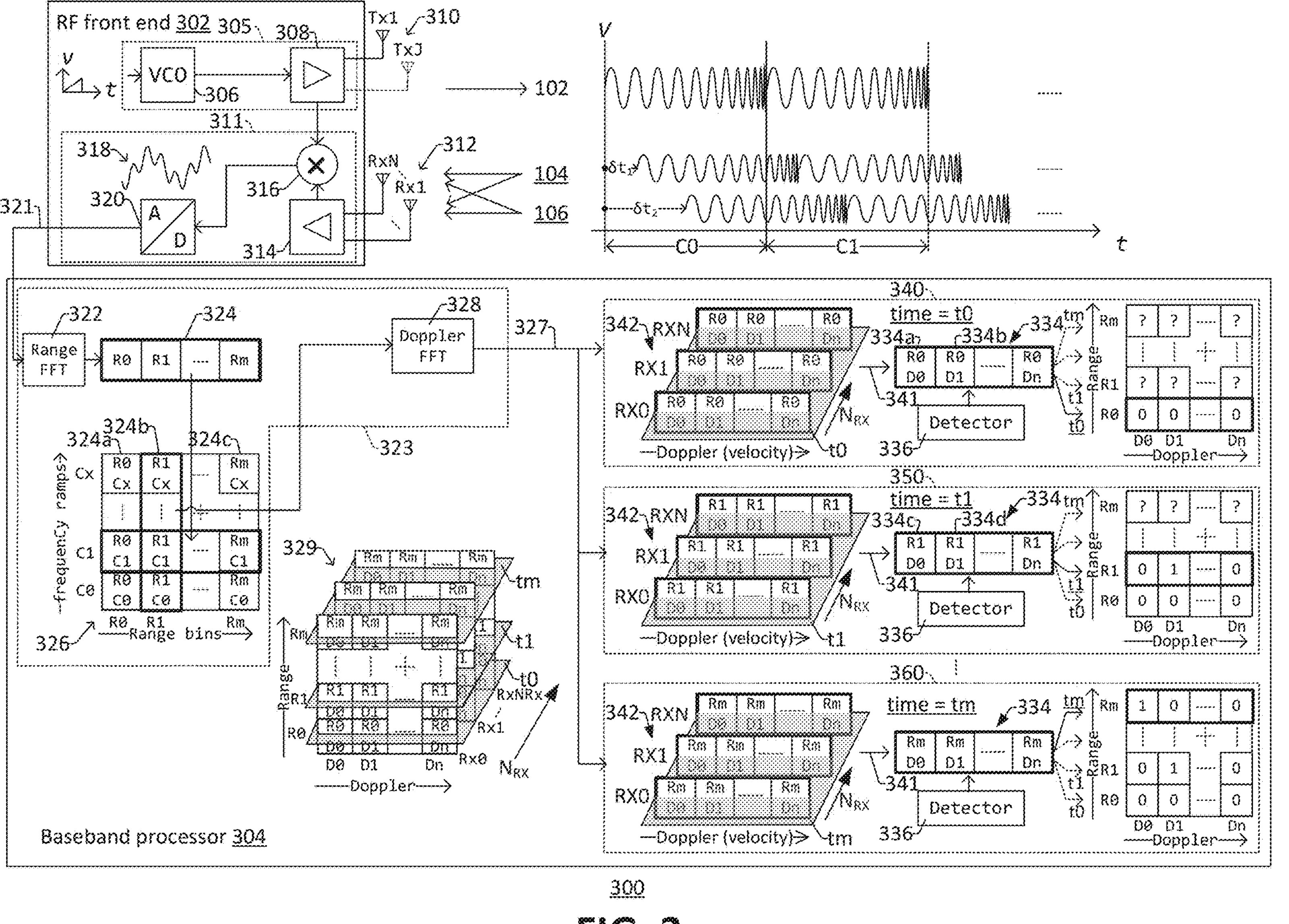
FIG. 3 illustrates a FMCW radar system in accordance with some aspects of the present disclosure.

FIG. 3 illustrates a FMCW radar transceiver 300 in accordance with some embodiments, and which can make use of FMCW waveforms such as described in FIGS. 1-2. The transceiver 300 includes a radio frequency (RF) front end 302 and a baseband processor 304 downstream of the RF front end 302. The illustrated RF front end 302 illustrates a transmission path 305 and a reception path 311, though multiple transmission paths and/or reception paths are typically present. The transmission path 305 includes a voltage controlled oscillator (VCO) 306, and a transmission amplifier 308, and is coupled to J transmission antennae 310 (wherein J is any positive integer). The reception path 311 is coupled to N reception antennae 312 (N=any positive integer), and includes a reception amplifier 314, a mixer 316, and an analog-to-digital converter (ADC) 320. The reception antennae 312 are typically spaced apart at equal distances from one another.

During operation, the transmission path 305 generates a transmitted waveform 102 for example using the VCO 306. In the illustrated example, the transmitted waveform 102 has a frequency that ramps in time for x ramps transmitted in x time windows, respectively. The transmitted waveform is achieved by performing a frequency modulation of a carrier frequency, Fc, such that the instantaneous frequency of the transmitted waveform 102 varies from $f_{start}$ to $f_{end}$. The transmitter transmits the waveform 102 using the transmission amplifier 308 and transmission antennae 310.

The received waveforms or "echoes" (e.g., 104 and 106) are received by the reception antennae 312 and the reception amplifier 314. Because each target in the field generates a different echo, each reception antenna 312 sees a superposition of all received waveforms. The mixer 316 mixes the transmitted waveform 102 and the received waveforms 104, 106 and thereby multiplies these waveforms together to provide a mixed signal 318. This mixed signal 318 includes a beat frequency, which is a mixture of the frequencies of the received waveforms (e.g., δf1 and δf2). Thus, this beat frequency corresponds to time delays for the various targets, and wherein these time delays correspond to the ranges to the various targets, respectively. The beat frequency is much less than the carrier frequency, Fc; or the central frequency of the sweep. The beat frequency is then sampled by the ADC 320 to generate a digital radar signal 321.

In the baseband processor 304, a signal processing unit 323 includes a fast Fourier transform (FFT) circuit to perform a first FFT 322 and a second FFT 328. In some embodiments, the first FFT 322 and second FFT 328 correspond to separate FFT circuit instantiations arranged in series on an integrated circuit, and which collectively correspond to the FFT circuit. In other embodiments, however, first FFT 322 and second FFT 328 can be a single FFT circuit with surrounding circuitry to re-route data through the single FFT circuit multiple times to achieve the data processing illustrated in FIG. 3. In either case, the result is that the first FFT—or Range FFT 322—is initially performed on the digital radar signal 321. The Range FFT 322 separates the individual beat frequencies in the digital radar signal 321, which directly leads to a first FFT result 324 with a number of range bins, with each range bin corresponding to a different range of ranges/distances in which objects can be found. This FFT process is repeated over every ramp of x ramps (e.g., from ramp C0 . . . to ramp Cx), and the FFT results are stored in a first memory 326 for each of x ramps. When all the x ramps are complete, a block of data representing the full field range data is stored in the first memory 326. The results in each range bin (e.g., @R1 range bin **324*b***, which includes a range value for Range R1 for each of the x ramps) may look similar for the various frequency ramps in that range bin, but, since the individual ramps C0, C1, . . . , Cx are separated in time, the samples in a given range bin carry a subtle phase difference induced by the Doppler shift of the various objects (e.g., a time delay due to a slight change in range for an object caused by the object moving by distance v*t, where v is the velocity of the object and t is time).

To recover Doppler information (e.g., velocity information about each object), the second FFT 328—or "Doppler FFT"—is performed on the co-located bins (represents the corner turn or transpose operation) from all ramps. The Doppler information is stream of complex values transmitted on bus 327 and stored in memory 342. Each complex value represents the magnitude (amplitude) and phase of the digital radar signal 321 at a respective range and Doppler coordinate pair. Note that in preferred embodiments the stream of complex values on 327 is not simply a two-dimensional range-Doppler map but has a third dimension and may thus be thought of as a 3D radar cube 329 having Range axis, Doppler axis, and a receive antennae axis (Nrx). Thus, the 3D radar cube 329 stored in memory 342 includes received powers from various objects in a field, and can be plotted according to range bins, Doppler bins; and NRx receive antennas.

Accordingly, in some embodiments of the present disclosure, the Doppler FFT block 328 individually processes a plurality of single range bins in a plurality of timeslots, respectively, wherein each single range bin pertains to a single range bin with multiple Doppler bins and multiple Rx antennae. To improve processing speed, results of the Doppler FFT block 328 are stored in memory 342, which is coupled to the signal processing circuit 323 via a first bus 327. A second bus 341 couples the memory 342 to an integration circuit 334, and the second bus 341 can also couple the memory 342 to a Direct Memory Access (DMA) that is included in or coupled to the detector 336 and/or integration circuit 334, such that the integration circuit 334 and/or detector 336 can read and write data from the memory 342 without continually hand-holding from a processor.

Whereas other approaches would process the entire 3D radar cube 329 only after the entire 3D radar cube 329 is stored, the present techniques do not require the entire 3D radar cube to be stored before starting processing and can be thought of in some regards as processing individual horizontal "slices" of such a 3D cube during respective timeslots (e.g., a first horizontal "slice" corresponding to a first Range R0 **324*a* processed during a first timeslot t0 in 340; a second horizontal "slice" corresponding to a second Range R1 324*b* processed during a second timeslot t1 in 350; . . . ; and an mth horizontal "slice" corresponding to a mth Range Rm 324*c* processed during an mth timeslot in 360). Because the Doppler FFT block 328 writes only Range-Doppler coordinate pairs of a single Range bin to memory 342 during any given timeslot, successive Doppler FFT results pertaining to different ranges can use the same memory 342** (and can overwrite the previous Doppler FFT results in that memory array for each time slot). In this way, this technique significantly reduces the amount of memory required for the system. This technique also facilitates pipelining of various downstream operations including detection of the various targets in an efficient manner.

For instance, in 340, during first time slot t0; the Doppler FFT block 328 outputs the stream of complex values such that a first plurality of Range-Doppler coordinate pairs sharing a first range value **324*a* (e.g., R0) are output to memory 342. Thus, the resultant output of the Doppler FFT block 328 for the first time slot to is stored in memory 342 with each column corresponding to a different Doppler shift (velocity) (e.g., D0, D1, . . . , Dn), and each row corresponding to a different receive antenna (Rx0, Rx1, . . . , RxN). In some cases, the size of the memory 342** corresponds to the number of Doppler bins times the number of receive antennae (e.g., (n+1)*(N+1)).

Similarly, in 350, during a second time slot t1, the Doppler FFT block 328 processes a second single range bin 324*b* (e.g., R1) over the multiple receive antennas (Rx0, Rx1, . . . , RxN). Thus, the resultant output of the Doppler FFT for the second time slot t1 is stored in the memory 342 with each column corresponding to a different Doppler shift (velocity) (e.g., D0, D1, . . . , Dn), and each row corresponding to a different receive antenna (Rx0, Rx1, . . . , RxN). In some cases, the data for the second time slot is written to the same memory 342 where the data of the first timeslot is written, and the data of the second timeslot overwrites the data of the first timeslot. In other cases, memory 342 can be larger, such that data is not overwritten.

Similarly, in 360, during an mth time slot tm, the Doppler FFT block 328 processes an mth single range bin 324*c* (e.g., Rm) over the multiple receive antennae (Rx0, Rx1, . . . , RxN). Thus, the resultant output of the Doppler FFT for the mth time slot tm is stored in the memory 342 with each column corresponding to a different Doppler shift (velocity) (e.g., D0, D1, . . . , Dn), and each row corresponding to a different receive antenna (Rx0, Rx1, . . . , RxN). Again, in some cases, the data for the mth time slot is written to the same memory 342 where the data from the first and second timeslots are written, and the data of the mth timeslot overwrites the data of the first and/or second timeslot.

For each timeslot, the diversity from multiple antennas is combined in an integration block 334 coupled to the memory 342 via a second bus 341. The integration block 334 has an input coupled to the memory 342. Thus, during operation, the output of the integration block 334 provides resultant power intensities for each Range/Doppler bin in successive timeslots. For example, a first resultant power intensity 334*a* is determined for R0, D0; a second resultant power intensity 334*b* is determined for R0, D1; a third resultant power intensity 334*c* is determined for R1, D0; a fourth resultant power intensity 334*d* is determined for R1, D1; and so on. More detailed examples of this integration are discussed below with regards to FIGS. 4A-4F.

Then, a detector 336 (which has an input that is coupled to an output of the integration block 334) performs processing to determine whether the detected power levels from the integration block 334 represent actual targets or phantom targets for each Range/Doppler coordinate pair. For example, at time tm in 360, as indicated by the "1"s in the radar map, a first actual target has been detected at Range Rm, Doppler (velocity) D0, and a second actual target has been detected at Range R1, Doppler (velocity) D1; while "0"s at other locations in the radar map indicate a lack of targets in those bins. The detector 336 can for example be realized as a 1-dimensional constant false alarm rate (CFAR) detector, 2-dimensional CFAR detector, or others. The integration block 334 and detector 336 can be implemented in hardware.

It will be appreciated that while reference numerals 340, 350, and 360 depict examples showing how the Doppler FFT block 328 and integration block 334 processes single range bins during respective time slots that are separate, these operations can also be pipelined, and thus 340, 350, and 360 may actually overlap in time in some regards. Some further examples of some ways in which pipelining can be implemented are illustrated and described for example further herein in FIGS. 5A-5B.

FIGS. 4A-4F illustrate a series of drawings that depict integration of virtual receive channels for the FMCW radar system of FIG. 3 (see e.g., 334 and 342 of FIG. 3). Briefly, by performing the integration with a Doppler offset over the various Doppler bins, this integration equates to a rate of phase modulation of the transmitted signal and by virtue of an appropriate physical separation of the Tx antenna, can be considered to be one or more virtual receive channels. In general, the total number of virtual receive channels equals JTx*NRx. FIGS. 4A-4F illustrate an example where there are three transmission channels, and hence three Doppler offsets. In this example, the three Doppler offsets are equally spaced from one another (e.g., by 10 Doppler bins); however in other embodiments, the first and second transmission channels can be spaced apart by a first Doppler offset, and the second and third transmission channels can be spaced apart by a second Doppler offset that differs from the first Doppler offset. In some embodiments, the number of expected transmission channels can be programmable to accommodate multiple different implementations of a Radar system, such that the integration block (e.g., 334 of FIG. 3, or 514 of FIG. 5) may include a programmable register that can be set by a central processing unit (CPU), Direct-Memory-Access (DMA) unit, or other system component.

In some cases, the integration may comply with the following pseudo-code, wherein hardware provides this functionality for each Range/Doppler bin:

```
sum_Range,Doppler = 0
offsets[3] = {0, 10, 20}
JTx = 3; NRx = 4
Loop T = 1 to JTx
  Loop R = 1 to NRx
    sum_Range,Doppler = Sum (Read Antenna[R] value at
    Doppler[offsets[T])
  End Loop R
End Loop T
Store sum_Range,Doppler
```

Figure 4A:
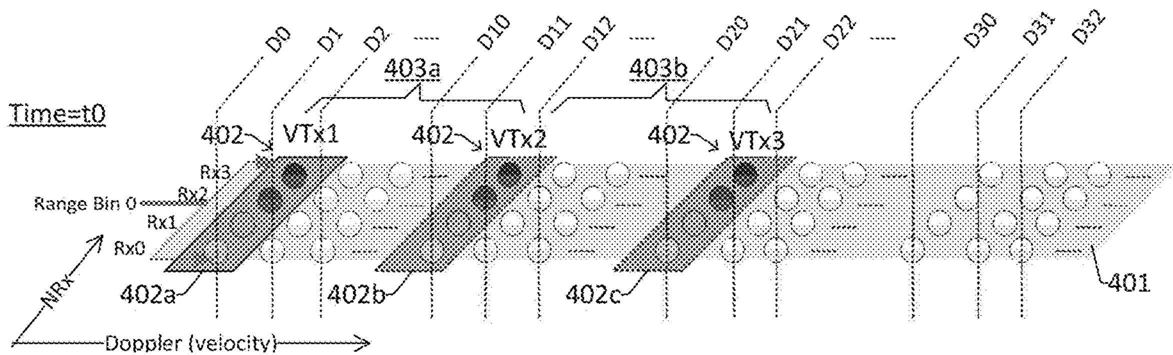
FIGS. 4A-4F illustrate a series of drawings that depict integration of virtual transmission channels for the FMCW radar system of FIG. 3.
Figure 4B:
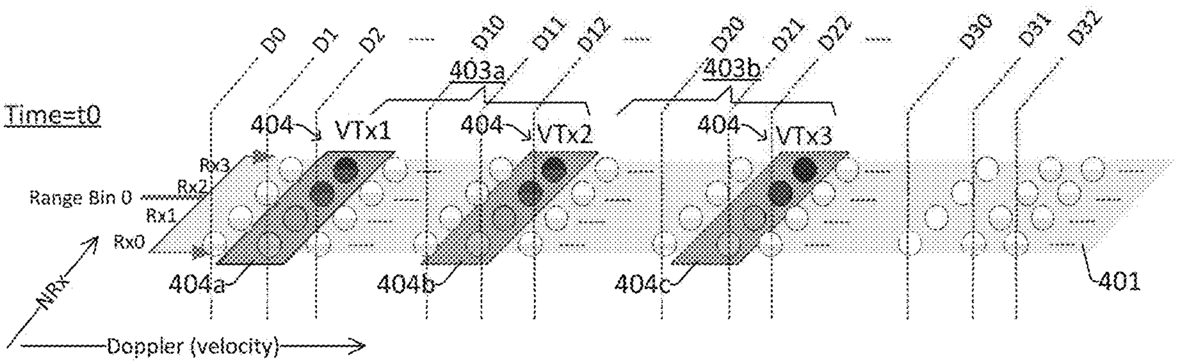
Figure 4C:
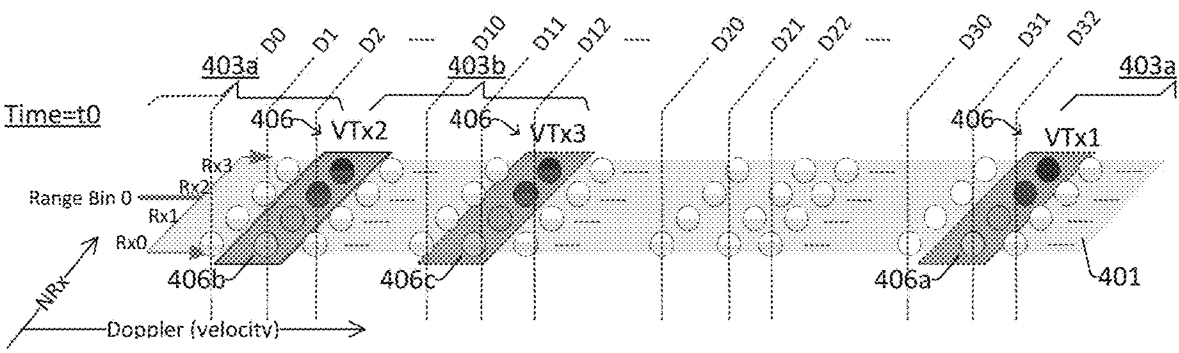

In FIGS. 4A-4C, a first plurality of Range-Doppler coordinate pairs 401 that share a first range value (R0) are stored in memory 342 during a first timeslot (e.g., 340 of FIG. 3).

In FIG. 4A, during a first portion of the first timeslot, the integration block 334 selects a first subset 402 from the first plurality of Range-Doppler coordinate pairs 401, wherein the first subset includes multiple Range-Doppler coordinate pairs (402*a*, 402*b*, 402*c*). The first Range-Doppler pair 402*a* is spaced apart from the second Range-Doppler pair 402*b* by a first Doppler offset 403*a*, and the second Range-Doppler pair 402*b* is spaced apart from the third Range-Doppler pair 402*c* by a second Doppler offset 403*b*, which can be equal to or different than the first Doppler offset. The integration block 334 sums the complex values of the first subset 402 to provide a first resultant power intensity (e.g., 334*a* in FIG. 3), which corresponds to a first Range-Doppler pair (e.g., R0, D0) of the first subset. This integration can include a weighted average over all virtual antennae (e.g., over NRx*JTx elements). The detector 336 then performs processing to determine whether the first resultant power intensity represents a no target, an actual target, or a phantom target for the first Range/Doppler coordinate pair.

In FIG. 4B, the virtual transmission channel is incremented and the next Doppler bin is evaluated. More particularly, during a second portion of the first timeslot, the integration block 334 selects a second subset 404 from the first plurality of Range-Doppler coordinate pairs 401, wherein the second subset includes multiple Range-Doppler coordinate pairs (404*a*, 404*b*, 404*c*). A first Range-Doppler pair 404*a* of the second subset 404 is spaced apart from a second Range-Doppler pair 404*b* of the second subset 404 by the first Doppler offset 403*a*, and the second Range-Doppler pair 404*b* is spaced apart from a third Range-Doppler pair 404*c* of the second subset 404 by the second Doppler offset 403*b*. The integration block 334 sums the complex values corresponding to the second subset 404 to provide a second resultant power intensity (e.g., 334*b* in FIG. 3), which corresponds to a second Range-Doppler pair (e.g., R0, D1) of the second subset 404.

Integration continues in this way to determine a power intensity for each Doppler element of Range 0. Thus, additional subsets can be selected from the first plurality of Range-Doppler coordinate pairs 401 using various Doppler offsets. The complex values can be summed to provide additional resultant power intensities. The target detection circuit then determines whether respective potential targets are present in the first range value and respective Doppler values based on the whether the respective resultant power intensities are greater than a predetermined threshold.

Further, as shown in FIG. 4C, during a thirty-first portion of the first timeslot, the integration block 334 selects a thirty-first subset 406 from the first plurality of Range-Doppler coordinate pairs 401, wherein the thirty-first subset includes multiple Range-Doppler coordinate pairs (406*a*, 406*b*, 406*c*). Assuming an example where there are 40 Doppler bins, when the power intensity for the higher Doppler elements are determined, the second and third offsets 403*a*, 403*b* may "wrap" around the Doppler bins in modulo fashion. In the illustrated example, a power intensity for the Doppler31, Range 0 element is determined by summing the power intensities for Doppler 31 (VTx1), Doppler 1 (VTx2) and Doppler 11 (VTx3) over the NRx antennae, thereby providing a single power intensity for the Doppler31, Range 0 element.

Figure 4D:
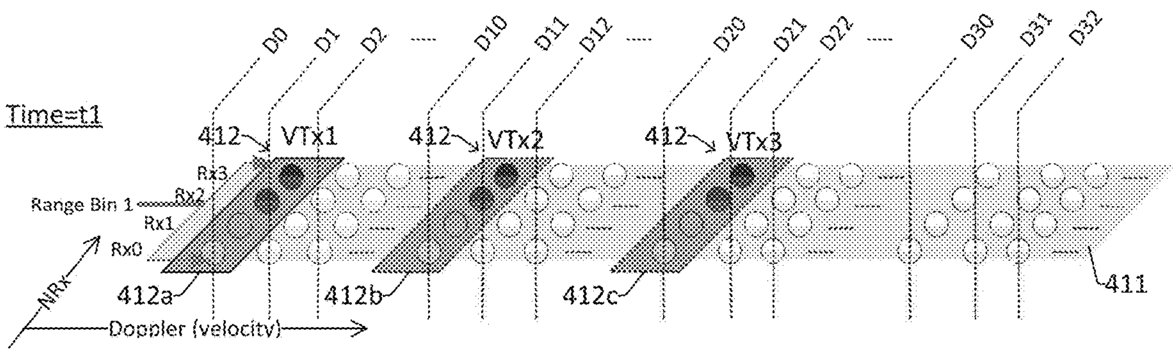
Figure 4E:
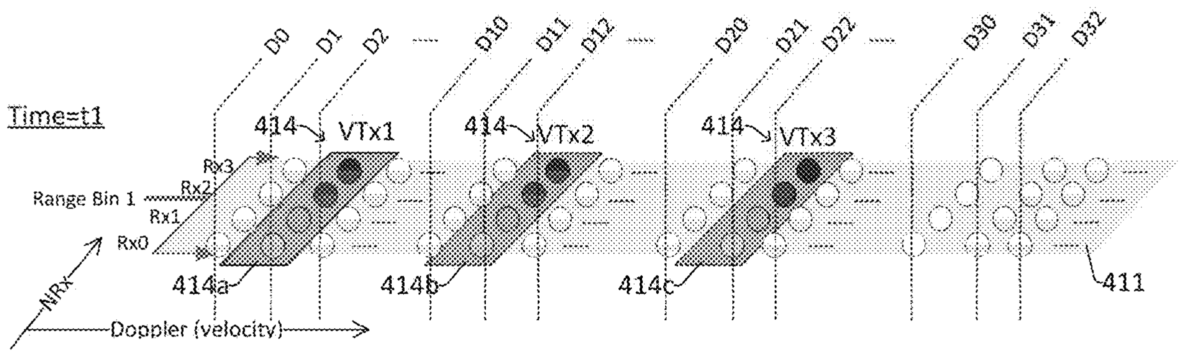
Figure 4F:
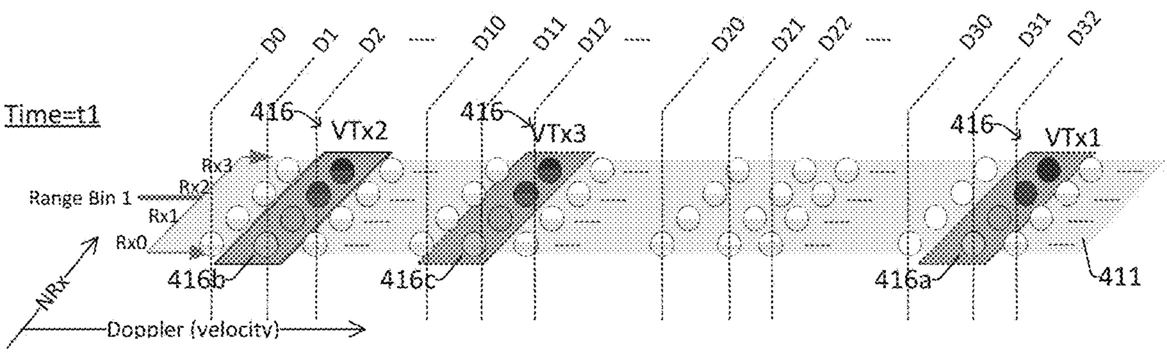

When a power intensity for each of the Range/Doppler bins for Range 0 is determined (e.g., as shown in FIG. 4A-4C), integration proceeds to the next range bin as shown in FIGS. 4D-4F. In FIG. 4D-4F the memory stores a second plurality of Range-Doppler coordinate pairs 411, which share a second range value (e.g., R1, which differs from the first range value R0). In some cases, the second plurality of Range-Doppler coordinate pairs 411 overwrite the first plurality of Range-Doppler coordinate pairs 401 in the memory 342.

In FIG. 4D, the integration block 334 selects a first subset 412 of multiple Range-Doppler coordinate pairs from the second plurality of Range-Doppler coordinate pairs 411. The integration block 334 sums the complex values corresponding to the first subset selected from the second plurality of Range-Doppler coordinate pairs, thereby providing a third resultant power intensity (e.g., 324*c* in FIG. 3) for the first Range-Doppler pair (R1, D0) of the first subset.

In FIG. 4E, the integration block 334 selects a second subset 414 of multiple Range-Doppler coordinate pairs from the second plurality of Range-Doppler coordinate pairs 411. The integration block 334 sums the complex values corresponding to the second subset to provide a second resultant power intensity (e.g., 324*d* in FIG. 3) for the second Range-Doppler pair (e.g., R1, D1) of the second subset 414. If FIG. 4F, the integration block 334 selects a third subset 416 of multiple Range-Doppler coordinate pairs from the second plurality of Range-Doppler coordinate pairs 411, and sums them.

Figure 5A:
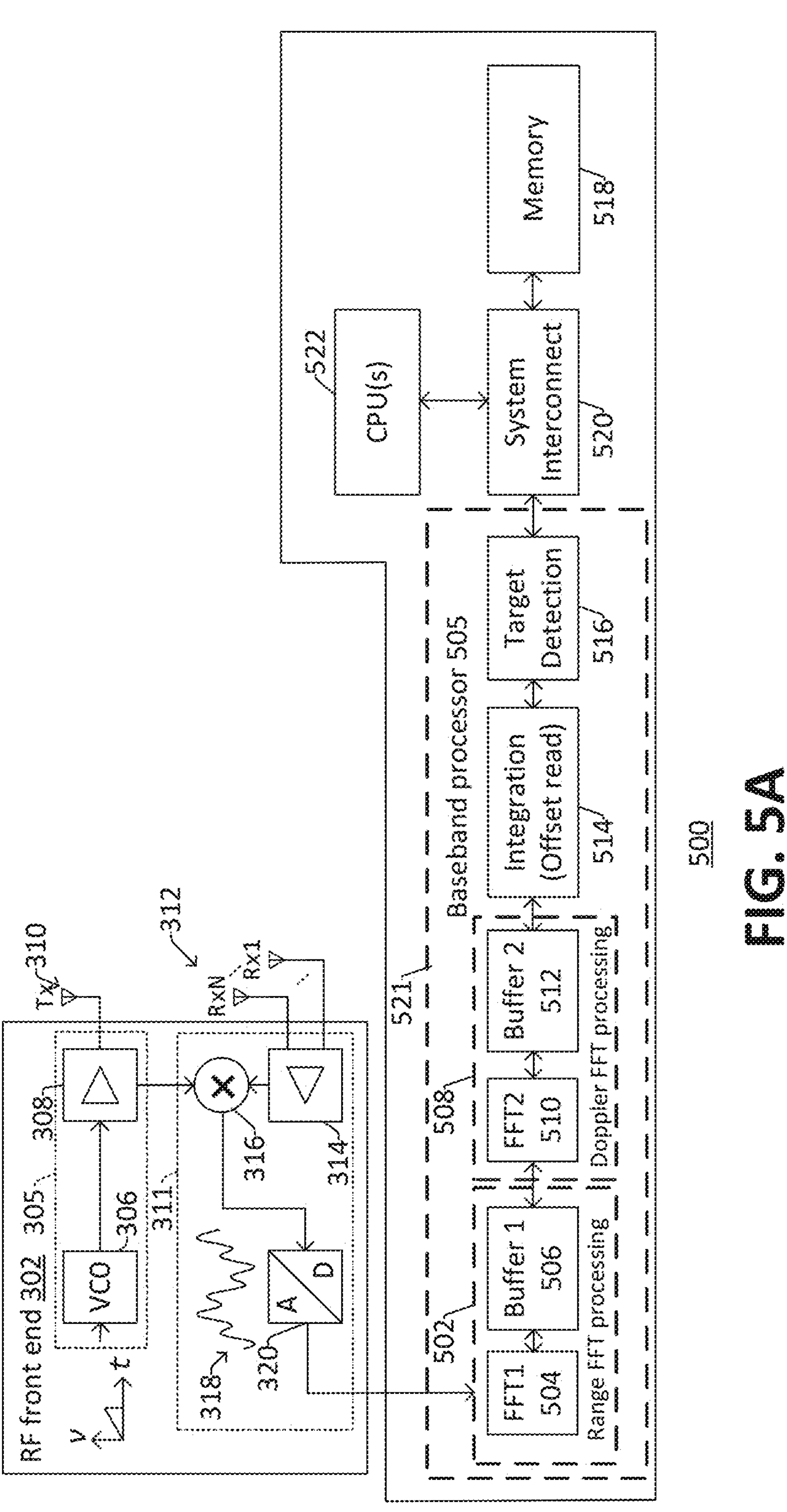
FIG. 5A illustrates hardware components of a FMCW radar system in accordance with some aspects of the present disclosure.

FIG. 5A shows some embodiments of a radar transceiver 500 in accordance with the present disclosure. The radar transceiver 500 includes an RF front end 302 as previously described, and baseband processor 505. The baseband processor 505 includes a first fast-Fourier transform (FFT) circuit 504, a second FFT circuit 510, an integration block 514, and a target detection block 516, which are arranged in series with one another. A first buffer 506 is coupled between the first FFT circuit 504 and the second FFT circuit 510, and a second buffer 512 is arranged between the second FFT circuit 510 and the integration block 514. One or more system memory blocks 518 (which can also be distributed at different points in the baseband processor in some cases), one or more central processing units (CPUs) 522, and a system interconnect 520 (which couples the CPUs to the memory blocks and/or the radar processing circuitry 521 to the CPU and/or memory blocks) are also included in the baseband processor. Other components, such as Direct-Memory-Access (DMA) blocks, additional buffers, and the like, can also be included as appropriate. In some embodiments, all circuit elements of the baseband processor 304 are fashioned on a single silicon substrate, while in other embodiments, a first subset of the circuit elements are formed on one silicon substrate and a second subset of the circuit elements are formed on another silicon substrate. For example, in some cases, the radar processing circuitry 521 can be located on one silicon substrate, and the system memory blocks 518, system interconnect 520, and/or CPUs 522 can be located on another silicon substrate. Other variations also fall within the present disclosure.

The first FFT circuit 504 and first buffer 506 are configured to perform range FFT processing, such as previously described in 322-326 and corresponding text of FIG. 3, for example. The second FFT circuit 510 and second buffer 512 are configured to perform Doppler FFT processing, such as previously described in 328 and corresponding text of FIG. 3, for example. The integration block 514 can be configured to perform integration, including integration of virtual transmitters, such as previously described in FIGS. 4A-4F for example.

Figure 5B:
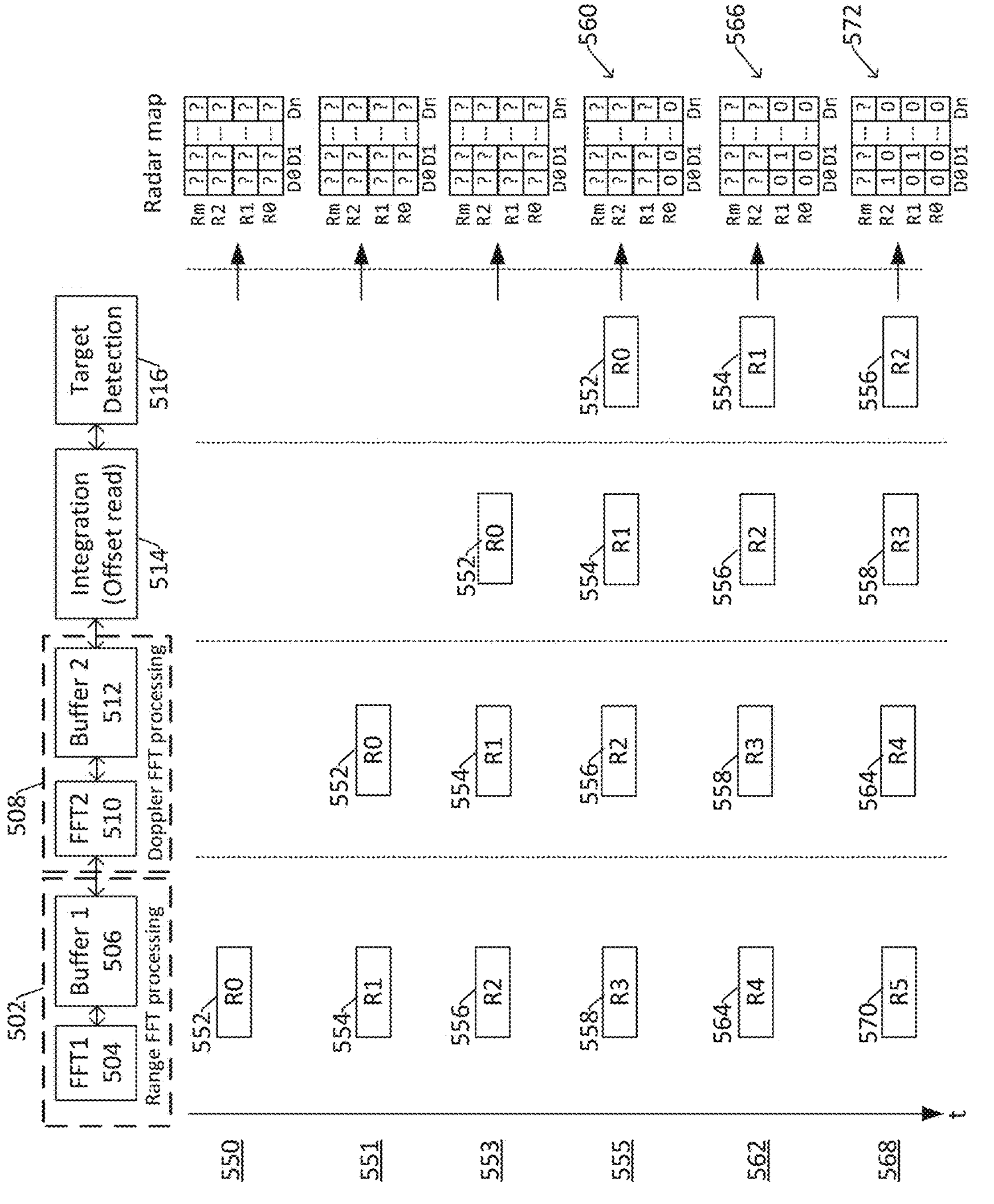
FIG. 5B illustrates some examples of how pipelining can occur in a FMCW radar system in accordance with some aspects of the present disclosure.

FIG. 5B shows a conceptual diagram of some examples of how pipelined processing can be carried out in the baseband processor 505 of FIG. 5A to update a Radar map in time. In FIG. 5B, the y axis of the page corresponds to time, and the x-axis is vertically aligned to show what the various components of the baseband processor of FIG. 5A are processing during each time. Neither of these axes is necessarily drawn to scale.

During a first time 550, a first FFT result 552 corresponding to Range 0 is processed by the first FFT circuit 504, and written to the first buffer 506. In some cases, the first FFT circuit 504 corresponds to the Range FFT 322 of FIG. 3, and the first buffer 506 corresponds to the first memory 326 of FIG. 3.

During a second time 551, the first FFT result 552 is processed by the second FFT circuit 510, and at the same time, a second FFT result 554 corresponding to Range 1 is processed by the first FFT circuit 504.

During a third time 553, the first FFT result 552 is processed by the integration block 514, and at the same time, the second FFT result 554 is processed by the second FFT circuit 510, and a third FFT result 556 corresponding to Range 2 is processed by the first FFT circuit 504.

During a fourth time 555, the first FFT result 552 is processed by the target detection block 516, and at the same time, the second FFT result 554 processed by the integration block 514, the third FFT result 556 is processed by the second FFT circuit 510, a fourth FFT result 558 corresponding to Range 3 is processed by the first FFT circuit 504. When the first FFT result 552 is processed by the target detection block 516, the radar map can be updated at time 560 to reflect whether targets are selected for the various Doppler bins of Range 0. In the illustrated example, zeros are shown to indicate that no targets are detected in the various Doppler bins of Range 0, but other conventions could also be used.

During a fifth time 562, the second FFT result 554 is processed by the target detection block 516, and at the same time, the third FFT result 556 is processed by the integration block 514, the fourth FFT result 558 is processed by the second FFT circuit 510, and a fifth FFT result 564 corresponding to Range 4 is processed by the first FFT circuit 504. When the second FFT result 554 is processed by the target detection block 516, the radar map can be updated at time 566 to reflect whether targets are detected for the various Doppler bins of Range 1. In the illustrated example, a one is shown at D1, R1 to indicate a target is detected at distance/range R1 and having a velocity corresponding to D1; while other Doppler/Range bins are each "zero" to indicate no other targets are detected in the other Doppler bins of range 1.

During a sixth time 568, the third FFT result 556 is processed by the target detection block 516, and at the same time, the fourth FFT result 558 is processed by the integration block 514, the fifth FFT result 564 is processed by the second FFT circuit 510, and a sixth FFT result 570 corresponding to Range 5 is processed by the first FFT circuit 504. When the third FFT result 556 is processed by the target detection block 516, the radar map can be updated at time 572 to reflect whether targets are detected for the various Doppler bins of Range 2. In the illustrated example, "1"s are shown at D1, R1 and D0, R2 to indicate targets are detected at these Ranges/Velocities; while other Doppler/Range bins are each filled with "0" to indicate no other targets are detected in the other Doppler bins of range 2.

Thus, as can be appreciated from FIG. 5B, arranging second FFT circuit 510, second buffer 512, integration block 514, and target detection block 516 in series with one another allows for efficient pipelining operations to be carried out. For example, compared to other approaches where range processing block 502 processes an entire 3D radar cube, and then Doppler processing block 508 (which includes second FFT circuit 510, and second buffer 512) performs a second FFT on the 3D radar cube; the pipelining of FIG. 5B allows for the Doppler FFT, integration, and target detection to occur in a much more efficient manner so the radar map can be processed and/or updated more quickly. This also allows post-processing (e.g., target processing) to start sooner and complete sooner than previous approaches.

Figure 6:
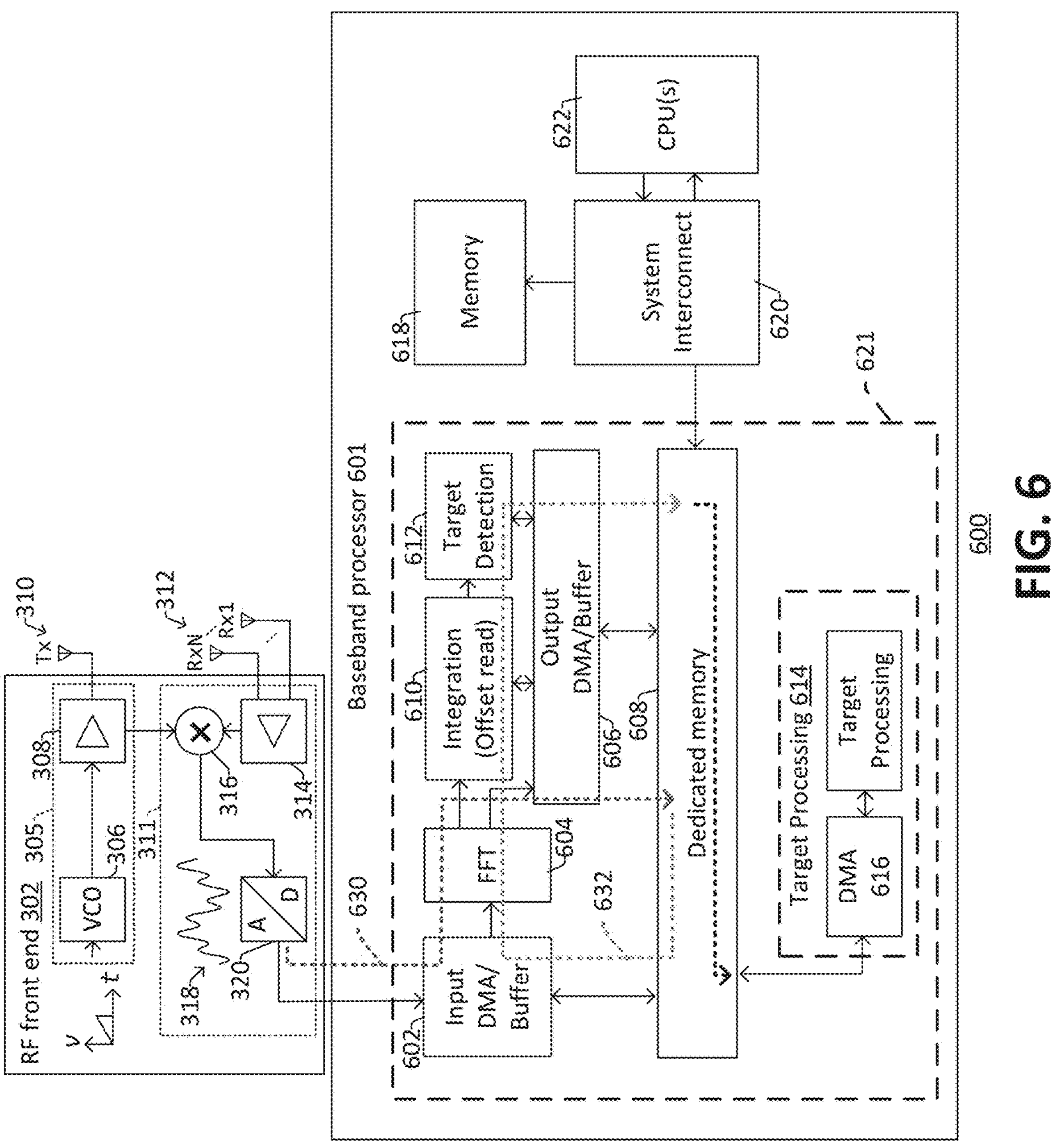
FIG. 6 illustrates hardware components of another FMCW radar system in accordance with some aspects of the present disclosure.

FIG. 6 shows some embodiments of another radar transceiver 600 in accordance with the present disclosure. The baseband processor 601 in this radar transceiver 600 includes an input DMA/buffer 602, FFT block 604, output DMA/buffer 606, dedicated memory 608, integration block 610, and target detection unit 612—all of which are implemented in hardware and operably coupled to one another via bus structures as shown. A target processing circuit 614, which is coupled to the dedicated memory 608 via a DMA 616; as well as one or more memory block(s) 618, CPU(s) 622 and system interconnect 620 are also included, and can be operably coupled as shown. In some embodiments, all circuit elements of the baseband processor 601 are fashioned on a single silicon substrate, while in other embodiments, a first subset of the circuit elements are formed on one silicon substrate and a second subset of the circuit elements are formed on another silicon substrate. For example, in some cases, the radar processing circuitry 621 can be located on one silicon substrate, and the memory block(s) 618, system interconnect 620, and/or CPU(s) 622 can be located on another silicon substrate. Other variations also fall within the present disclosure.

Compared to the radar transceiver of FIG. 5A where all hardware circuit components were arranged entirely in series, in the radar transceiver 600 of FIG. 6, the first fast-Fourier transform (FFT) function and second FFT function are both implemented within a single FFT hardware block 604 in FIG. 6. Thus, the circuitry of the baseband processor 601 is configured to route digital radar data through the baseband processor 601 in multiple rounds of pipelining. In a first round of the pipelining, the input DMA/buffer 602 passes data from the ADC 320 to the FFT block 604 (now acting as a Range FFT block), and the Range FFT result is then written to dedicated memory 608 via output DMA/buffer 606 (see arrow 630). In a second round of the pipelining, the input DMA/buffer 602 passes the data output from the first round (stored in dedicated memory 608) back to the FFT block 604 (now acting as a Doppler FFT block), to the integration block 610, and then to the target detection block, 612 which are again arranged in series with one another, before the output DMA/buffer 606 writes the result to dedicated memory 608 (see arrow 632). The integration block 610 can be configured to perform integration, including integration of virtual transmitters, such as previously described in FIGS. 4A-4F for example. Although FIG. 5A and FIG. 6 depict some examples of hardware architectures for radar transceivers, it will be appreciated that other hardware architectures for radar transceivers are also contemplated as falling within the scope of the present disclosure, and these are merely non-limiting examples.

Figure 7:
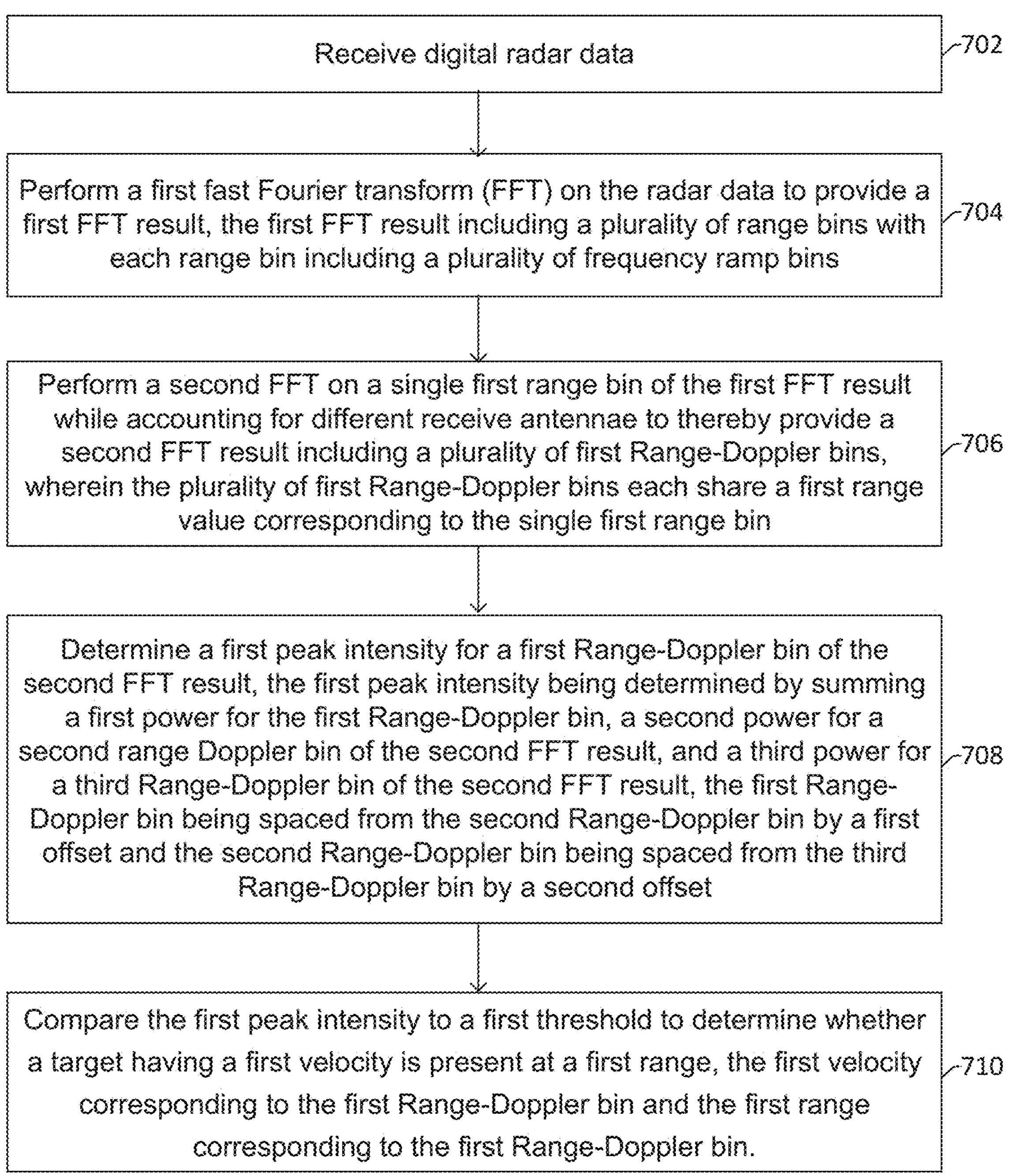
FIG. 7 illustrates a method in flow-chart format according to some aspects of the present disclosure.

FIG. 7 depicts a method 700 in accordance with some aspects of this disclosure.

In block 702, digital radar data is received. In some aspects, block 702 can correspond to digital radar data received from ADC 320 in FIG. 3.

In block 704, a first fast Fourier transform (FFT) is performed on the digital radar data to provide a first FFT result. The first FFT result includes a plurality of range bins with each range bin including a plurality of frequency ramp bins. In some aspects, block 704 can correspond to Range FFT 322 providing a first FFT result 324 in FIG. 3.

In block 706, a second FFT is performed on a single first range bin of the first FFT result while accounting for different receive antennae to thereby provide a second FFT result including a plurality of first Range-Doppler bins. The plurality of first Range-Doppler bins each share a first range value corresponding to the single first range bin. In some aspects, block 706 can correspond to Doppler FFT block 328 individually processing a plurality of single range bins in a plurality of timeslots, respectively, wherein each single range bin pertains to a single range bin with multiple Doppler bins and multiple Rx antennae, as illustrated an describe in FIG. 3.

In block 708, a first peak intensity is determined for a first Range-Doppler bin of the second FFT result. The first peak intensity is determined by summing a first power for the first Range-Doppler bin, a second power for a second range Doppler bin of the second FFT result, and a third power for a third Range-Doppler bin of the second FFT result, the first Range-Doppler bin being spaced from the second Range-Doppler bin by a first offset and the second Range-Doppler bin being spaced from the third Range-Doppler bin by a second offset. In some aspects, block 708 can correspond to the integration of FIG. 4A, wherein a power intensity for a first Range Doppler bin (Range 0, Doppler 0) is determined by summing a first power intensity for R0,D0, a second power intensity for R0, D10, and a third power intensity for R0, D20. Other power intensities can also be determined for other Range Doppler bins by incrementing the Doppler bins and/or Range bins, and re-summing the intensity.

In block 710, the first peak intensity is compared to a first threshold to determine whether a target having a first velocity is present at a first range. The first velocity corresponds the first Range-Doppler bin and the first range corresponds to the first Range-Doppler bin. In some aspects, this corresponds to CFAR detection, and a target is determined to be present if the peak intensity (e.g., measured power intensity) at a given Range/Doppler bin is greater than the first threshold. The first threshold can be determined using guard cells and/or training cells in some approaches.

Thus, some aspects of the present disclosure relate to a method for radar processing. In the method, radar data is received, and a fast Fourier transform (FFT) is performed on the radar data to provide a stream of complex values. The stream of complex values describes a plurality of receive antennae and a plurality of Range-Doppler coordinate pairs. A first power intensity is determined for a first set of Range-Doppler coordinate pairs within the stream of complex values. The first set of Range-Doppler coordinate pairs share a first Range value and a first Doppler value for each of the plurality of receive antennae. A second power intensity is determined for a second set of Range-Doppler coordinate pairs within the stream of complex values. The second set of Range-Doppler coordinate pairs share the first Range value but have a second Doppler value for each of the plurality of receive antennae. The second Doppler value has a first Doppler offset relative to the first Doppler value. The first power intensity and the second power intensity are summed to provide a first resultant power intensity for the first Range value and the first Doppler value.

In some aspects, the method determines whether a potential target is present in the first Range value based on whether the first resultant power intensity is greater than a predetermined threshold.

In some aspects, the method also determines a third power intensity for a third set of Range-Doppler coordinate pairs within the stream of complex values. The third set of Range-Doppler coordinate pairs shares the first Range value but has a third Doppler value that is offset by a second Doppler offset relative to second Doppler value. A third power intensity is summed with the first power intensity and the second power intensity to provide the first resultant power intensity for the first Range value and the first Doppler value.

In some aspects, the method also determines a fourth power intensity for a fourth set of Range-Doppler coordinate pairs within the stream of complex values. The fourth set of Range-Doppler coordinate pairs shares the first Range value and shares a fourth Doppler value for each of the plurality of receive antennae, the fourth Doppler value being between the first Doppler value and the second Doppler value; determining a fifth power intensity for a fifth set of Range-Doppler coordinate pairs within the stream of complex values, the fifth set of Range-Doppler coordinate pairs sharing the first Range value and sharing a fifth Doppler value for each of the plurality of receive antennae, the fifth Doppler value being offset from the fourth Doppler value; and summing the fourth power intensity with the fifth power intensity to provide a second resultant power intensity for the first Range value and the fourth Doppler value.

In some aspects, the first Doppler offset is equal to the second Doppler offset.

In some aspects, the first Doppler offset is different from the second Doppler offset.

Some aspects of the present disclosure relate to a radar system. A radio frequency (RF) receiver in the system is configured to receive radar data at a plurality of receive antennae. A fast Fourier transform (FFT) circuit is coupled to the RF receiver. The FFT circuit is configured to perform a FFT on the radar data to provide a stream of complex values. The stream of complex values includes a plurality of Range-Doppler coordinate pairs that pertain to the plurality of receive antennae. A memory is coupled to the FFT circuit. The memory is configured to store a first plurality of Range-Doppler coordinate pairs sharing a first range value from the stream of complex values. The first plurality of Range-Doppler coordinate pairs correspond to the plurality of receive antennae and correspond to a plurality of Doppler values. An integration block is coupled to the memory. The integration block is configured to select a first subset of multiple Range-Doppler coordinate pairs from the first plurality of Range-Doppler coordinate pairs, and sum the complex values of the first subset of the multiple Range-Doppler coordinate pairs to provide a first resultant power intensity for a first Range-Doppler pair of the first subset.

In some aspects, the integration block is further configured to select a second subset of multiple Range-Doppler coordinate pairs from the first plurality of Range-Doppler coordinate pairs, and sum the complex values corresponding to the second subset of the multiple Range-Doppler coordinate pairs to provide a second resultant power intensity for a second Range-Doppler pair of the second subset.

In some aspects, the radar system further comprises a target detection circuit coupled to the integration block. The target detection circuit is configured to determine whether a potential target is present in the first range value based on whether the first resultant power intensity is greater than a predetermined threshold.

In some aspects, the memory is configured to store a second plurality of Range-Doppler coordinate pairs sharing a second range value from the stream of complex values. The second plurality of Range-Doppler coordinate pairs correspond to the plurality of receive antennae and correspond to the plurality of Doppler values. The second range value differs from the first range value. The integration block is further configured to select a first subset of multiple Range-Doppler coordinate pairs from the second plurality of Range-Doppler coordinate pairs, and sum the complex values corresponding to the first subset of the multiple Range-Doppler coordinate pairs selected from the second plurality of Range-Doppler coordinate pairs to provide a third resultant power intensity for the first Range-Doppler pair of the first subset.

In some aspects, the integration block is further configured to select a second subset of multiple Range-Doppler coordinate pairs from the second plurality of Range-Doppler coordinate pairs, and sum the complex values corresponding to the second subset of the multiple Range-Doppler coordinate pairs to provide a second resultant power intensity for a second Range-Doppler pair of the first subset.

In some aspects, the second plurality of Range-Doppler coordinate pairs overwrite the first plurality of Range-Doppler coordinate pairs in the memory.

In some aspects, the radar system further comprises a target detection circuit coupled to the integration block. The target detection circuit is configured to determine a presence of one or more potential targets for the first range value and the second range value, respectively, based on whether first resultant power intensity and the third resultant power intensity, respectively, are greater than a predetermined threshold.

In some aspects, the radar system is a frequency modulated continuous wave (FMCW) radar system.

Some aspects of the present disclosure relate to baseband processor for radar. The baseband processor includes a Doppler fast Fourier transform (FFT) circuit having an input and an output. An integration circuit has an input coupled to the output of the Doppler FFT circuit. A target detection circuit has an input coupled to an output of the integration circuit. The Doppler FFT circuit, the integration circuit, and the target detection circuit are each disposed on a silicon substrate, and the target detection circuit is arranged in series with the integration circuit and in series with the target detection circuit.

In some aspects, the baseband processor further comprises a first bus coupling the output of the Doppler FFT circuit to the input of the integration circuit; and a second bus which is distinct from the first bus coupling the output of the integration circuit to the input of the target detection circuit.

In some aspects, the first bus comprises a first set of interconnect wires disposed in a dielectric structure over the silicon substrate, and the second bus comprises a second set of interconnect wires over the silicon substrate.

In some aspects, the Doppler FFT circuit is configured to perform a FFT on a single first range bin that includes multiple Doppler bins while accounting for different receive antennae, to thereby provide a Doppler FFT result.

In some aspects, the integration circuit is configured to determine a first peak intensity for a first Range-Doppler bin of the Doppler FFT result. The first peak intensity is determined by summing a first power for the first Range-Doppler bin, a second power for a second Range-Doppler bin of the Doppler FFT result, and a third power for a third Range-Doppler bin of the Doppler FFT result. The first Range-Doppler bin is spaced from the second Range-Doppler bin by a first offset and the second Range-Doppler bin is spaced from the third Range-Doppler bin by a second offset.

In some aspects, the baseband processor is included in a frequency modulated continuous wave (FMCW) radar system.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for radar processing:

receiving radar data;

performing a fast Fourier transform (FFT) on the radar data to provide a stream of complex values such that a first set of Range-Doppler coordinate pairs is provided during a first time slice within the stream of complex values and a second set of Range-Doppler coordinate pairs is provided during the first time slice within the stream of complex values, the stream of complex values describing a plurality of receive antennae and a plurality of Range-Doppler coordinate pairs;

determining a first power intensity for the first set of Range-Doppler coordinate pairs within the stream of complex values, each pair of the first set of Range-Doppler coordinate pairs sharing having a first Range value that is the same for all pairs of the first set and each pair of the first set having a first Doppler value that is the same for all pairs of the first set for each of the plurality of receive antennae;

determining a second power intensity for the second set of Range-Doppler coordinate pairs provided during the first time slice within the stream of complex values, each pair of the second set of Range-Doppler coordinate pairs having the first Range value but each pair of the second set having a second Doppler value that is the same for all pairs of the second set for each of the plurality of receive antennae, the second Doppler value having a first Doppler offset relative to the first Doppler value; and summing the first power intensity and the second power intensity to provide a first resultant power intensity for the first Range value and the first Doppler value.

2. The method of claim 1, further comprising:

determining whether a potential target is present in the first Range value based on whether the first resultant power intensity is greater than a predetermined threshold.

3. The method of claim 1, further comprising:

determining a third power intensity for a third set of Range-Doppler coordinate pairs within the stream of complex values, the third set of Range-Doppler coordinate pairs sharing the first Range value but having a third Doppler value that is offset by a second Doppler offset relative to second Doppler value; and summing the third power intensity with the first power intensity and the second power intensity to provide the first resultant power intensity for the first Range value and the first Doppler value.

4. The method of claim 3, wherein the first Doppler offset is equal to the second Doppler offset.

5. The method of claim 3, wherein the first Doppler offset is different from the second Doppler offset.

6. The method of claim 1, further comprising:

determining a fourth power intensity for a fourth set of Range-Doppler coordinate pairs within the stream of complex values, the fourth set of Range-Doppler coordinate pairs sharing the first Range value and sharing a fourth Doppler value for each of the plurality of receive antennae, the fourth Doppler value being between the first Doppler value and the second Doppler value;

determining a fifth power intensity for a fifth set of Range-Doppler coordinate pairs within the stream of complex values, the fifth set of Range-Doppler coordinate pairs sharing the first Range value and sharing a fifth Doppler value for each of the plurality of receive antennae, the fifth Doppler value being offset from the fourth Doppler value; and summing the fourth power intensity with the fifth power intensity to provide a second resultant power intensity for the first Range value and the fourth Doppler value.

7. The method of claim 1, wherein all Range-Doppler coordinate pairs provided during the first time slice in the stream of complex values have the first Range-value.

8. A radar system:

a radio frequency (RF) receiver configured to receive radar data at a plurality of receive antennae;

a fast Fourier transform (FFT) circuit coupled to the RF receiver, the FFT circuit configured to perform an FFT on the radar data to provide a stream of complex values such that a first plurality of Range-Doppler coordinate pairs provided during a first time slice within the stream of complex values each have a single first range value and a plurality of different Doppler values, respectively, and such that a second plurality of Range-Doppler coordinate pairs provided during a second time slice within the stream of complex values each have a single second range value and the different Doppler values, respectively, the single first Range value differing from the single second Range value and the stream of complex values including a plurality of Range-Doppler coordinate pairs that pertain to the plurality of receive antennae;

a memory coupled to the FFT circuit, the memory configured to store the first plurality of Range-Doppler coordinate pairs and to store the second plurality of Range-Doppler coordinate pairs; and an integration block coupled to the memory, the integration block configured to select a first subset of multiple Range-Doppler coordinate pairs from the first plurality of Range-Doppler coordinate pairs, and sum the complex values of the first subset of the multiple Range-Doppler coordinate pairs to provide a first resultant power intensity for a first Range-Doppler pair of the first subset.

9. The radar system of claim 8:

wherein the integration block is further configured to select a second subset of multiple Range-Doppler coordinate pairs from the first plurality of Range-Doppler coordinate pairs, and sum the complex values corresponding to the second subset of the multiple Range-Doppler coordinate pairs to provide a second resultant power intensity for a second Range-Doppler pair of the second subset.

10. The radar system of claim 8, further comprising:

a target detection circuit coupled to the integration block, the target detection circuit configured to determine whether a potential target is present in the first range value based on whether the first resultant power intensity is greater than a predetermined threshold.

11. The radar system of claim 8, wherein the integration block is further configured to select a first subset of multiple Range-Doppler coordinate pairs from the second plurality of Range-Doppler coordinate pairs, and sum the complex values corresponding to the first subset of the multiple Range-Doppler coordinate pairs selected from the second plurality of Range-Doppler coordinate pairs to provide a third resultant power intensity for the first Range-Doppler pair of the first subset.

12. The radar system of claim 11:

wherein the integration block is further configured to select a second subset of multiple Range-Doppler coordinate pairs from the second plurality of Range-Doppler coordinate pairs, and sum the complex values corresponding to the second subset of the multiple Range-Doppler coordinate pairs to provide a second resultant power intensity for a second Range-Doppler pair of the first subset.

13. The radar system of claim 11, wherein the second plurality of Range-Doppler coordinate pairs overwrite the first plurality of Range-Doppler coordinate pairs in the memory.

14. The radar system of claim 11, further comprising:

a target detection circuit coupled to the integration block, the target detection circuit configured to determine a presence of one or more potential targets for the first range value and the second range value, respectively, based on whether the first resultant power intensity and the third resultant power intensity, respectively, are greater than a predetermined threshold.

15. The radar system of claim 8, wherein the radar system is a frequency modulated continuous wave (FMCW) radar system.

16. The method of claim 8, wherein all Range-Doppler coordinate pairs provided during the first time slice in the stream of complex values have the single first range value; and wherein all Range-Doppler coordinate pairs provided during the second time slice in the stream of complex values have the single second range value.

* * * * *